F. G. KOEHLER.
SELF LUBRICATING WHEEL.
APPLICATION FILED OCT. 9, 1911.
1,074,876.
Patented Oct. 7, 1913.
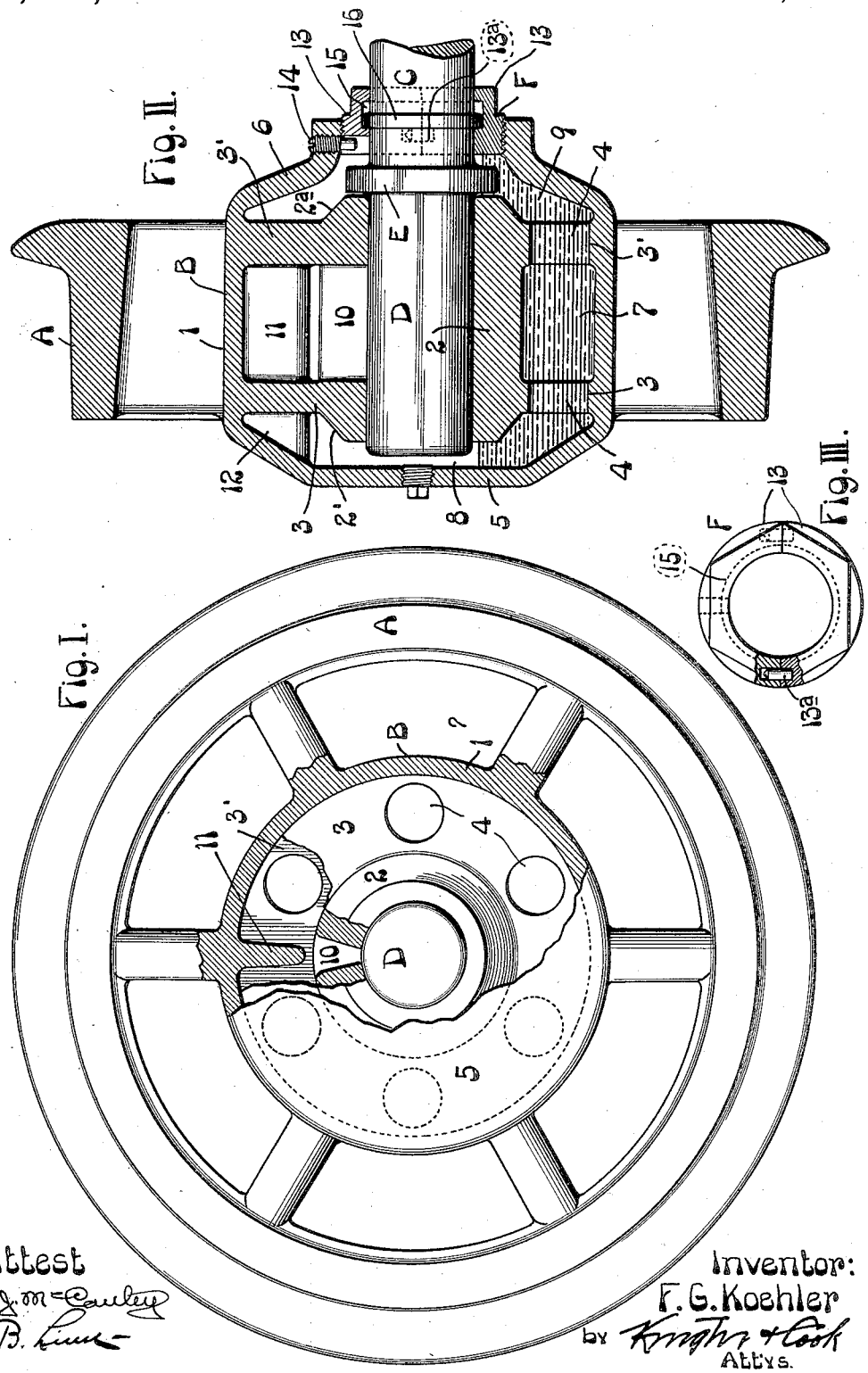
Attest
Inventor:
F. G. Koehler

UNITED STATES PATENT OFFICE.

FRANK G. KOEHLER, OF ST. LOUIS, MISSOURI.

SELF-LUBRICATING WHEEL.

1,074,876. Specification of Letters Patent. Patented Oct. 7, 1913.

Application filed October 9, 1911. Serial No. 653,593.

*To all whom it may concern:*

Be it known that I, FRANK G. KOEHLER, a citizen of the United States of America, and a resident of the city of St. Louis, in the State of Missouri, have invented certain new and useful Improvements in Self-Lubricating Wheels, of which the following is a full, clear, and exact description, reference being had to the accompanying drawings, forming part of this specification.

My invention relates to that class of self lubricating wheels provided with lubricant reservoirs from which lubricant is delivered to the journals on which the wheels turn, the present improvement being one more particularly intended for embodiment into mining car wheels, but of utility in other types of wheels and pulleys.

The invention has for its object to provide an improved construction of lubricant reservoir of very simple type and of a high degree of efficiency.

It also has for its object to provide in a self lubricating wheel a simple and efficient means for retaining the wheel upon the journal to which it is applied, and for retaining the lubricant in the wheel.

In the accompanying drawings:—Figure I is a view partly in side elevation and partly broken away and in section of my improved self lubricating wheel. Fig. II is a cross section through the wheel; and Fig. III is in part an elevation and in part a section of the retaining ring.

In the drawings, A designates the rim and B the hub of my wheel cast in one piece.

When my wheel is utilized in a mining or other car it is applied to the journal D of an axle C, the latter being supplied with an abutment collar E located at the rear end of the journal.

The hub of my wheel contains the lubricant reservoir and comprises a central annulus 1 concentric with the bearing 2 that receives the journal to be lubricated. It also comprises parallel radial webs 3 and 3' that join the annulus and bearing, a front cap member 5 spaced from the outer web 3, and a rear cap member 6 spaced from the inner web 3'.

In the hub B between the webs 3 and 3' is a circumferential main lubricant compartment 7 that has communication with an outer auxiliary lubricant compartment 8 between the outer web 3 and the front cap member 5 through perforations 4 in said outer web and also has communication through perforations 4 in the inner web 3' with an inner auxiliary lubricant compartment 9 between the web 3' and the rear cap member 6.

In the bearing 2 of the hub B is an outwardly flaring lubricant delivery duct 10 extending across, and that leads from, the compartment 7 to the journal in said bearing and through which lubricant is delivered to the journal during the rotation of the wheel. The compartment 7 contains an inwardly projecting fin or lubricant carrying member 11 that extends across the same toward the axis of the wheel from the annulus 1 between the webs 3 and 3', and is located opposite the lubricant duct 10 or in such close proximity to said duct between the walls thereof as to provide for its service in elevating the lubricant in the compartment 7 during the rotation of the wheel and the delivery of such lubricant through the duct to the journal in the bearing of the wheel hub.

It will be apparent that by the use of the lubricant carrying member 11 and lubricant duct 10 I provide for a positive delivery of lubricant to the journal upon each complete rotation of the wheel, and that this delivery is maintained as long as there is any lubricant in the reservoir of the wheel or until the supply of lubricant is entirely depleted.

The main portion of the journal on which my wheel operates is supplied with lubricant due to the delivery from the central compartment 7 through the duct 10, but it is desirable to also supply lubricant to the journal at the ends of the bearing 2. It is for this reason that I provide the lubricant compartments 8 and 9 adjoining the central lubricant compartment. A portion of the bearing 2 projects into the lubricant compartment 8 and is provided with an inclined annular face 2' upon which lubricant may be elevated during the rotation of the wheel to move in a downward course and be deposited onto the portion of the spindle that normally or at certain times projects into the lubricant compartment 8. To add to the efficiency of the deposit of lubricant onto the journal from the compartment 8, I preferably utilize in said compartment an inwardly projecting lubricant elevating fin or carrier 12, the service of which is similar to that of the carrier 11.

Lubricant is delivered from the lubricant compartment 9 to the journal through the medium of a rear extension of the hub bearing 2 provided with an inclined annular face 2$^a$ on which the lubricant is elevated and from which it descends to the journal.

The rear cap member 6 of the hub B is provided with an opening of sufficient diameter to permit of the introduction of the journal into the wheel, or, referring more particularly to the structure shown in the drawings, the introduction of the axle spindle D and the collar E into said hub. The opening in this rear cap member is closed, aside from its partial closure by the axle shaft, by a retaining ring F, having two functions, namely, those of retaining the wheel upon the axle, and retaining the lubricant in the wheel. The retaining ring comprises two alined segments 13 held interlocked by means of dowels 13$^a$ and provided with external screw threads that fit internal screw threads in the rear cap member 6, whereby the ring is connected to the hub B. The retaining ring is held from rotation and consequently maintained positively in the opening in the rear cap member 6 of the hub by a stop screw or pin 14 which passes through said rear cap member and enters into a radial hole provided therefor in one of the ring segments.

The retaining ring F constitutes the sole means by which my self lubricating wheel is held from escape from the axle to which it is fitted. In this service the retaining ring acts as an abutment for the collar E on the axle, and inasmuch as the ring is positively held in place, there is no opportunity for more than a limited degree of play of the wheel upon the axle, it being understood that a limited degree of play is desirable between a car wheel and its axle, in view of variations in the spacing of track rails, on which the wheels travel.

The retaining ring F is designed with the object in view of providing for the confinement thereby of the lubricant used in my wheel, and this service is obtained largely through the close fitting of the ring around the axle C. Experience has demonstrated, however, that more or less lubricant will ooze between the retaining ring and an axle if entire reliance is placed upon close fitting of the ring to the axle alone. To overcome oozing of the lubricant between the axle and the ring, I provide the ring with an internal annular chamber 15, and arranged upon the axle C an annular packing collar 16 that is movable to and fro in said annular chamber during the movement of the wheel longitudinally of the axle. The packing collar just mentioned provides an abutment in the path of movement of lubricant along the axle when it tends to ooze through the retaining ring and, therefore, stops the flow of lubricant before it escapes from the wheel along the axle. The semicircular grooves forming the annular chamber 15 and the external screw threads on the sectional retaining ring F are positively held in matching relation by the dowel pins 13$^a$.

I claim:

A self lubricating wheel cast in one piece and comprising a hub forming an oil reservoir, said oil reservoir having a cylindrical wall and inner and outer end walls, a journal bearing within said oil reservoir, annular webs connecting said journal bearing to said cylindrical wall and dividing said oil reservoir into three compartments, a lubricant elevating fin 12 extending entirely across the outer compartment and joining the outer wall of said reservoir to one of said annular webs, a lubricant elevating fin 11 extending entirely across the middle compartment, said journal bearing having a radial outwardly flaring delivery duct 10 extending entirely across said middle compartment and located directly opposite to the fin 11, the said inner wall being provided with a screw threaded journal receiving opening, and a ring F in said opening forming a guard element adapted to prevent the escape of lubricant and also serving to hold the wheel in position, said ring being composed of externally screw threaded segments each of which is provided with a semicircular groove for the reception of a packing collar 16, and means for interlocking said segments with each other so as to position their screw threads in matching relation.

FRANK G. KOEHLER.

In the presence of—
E. B. LINN,
A. J. McCAULEY.